United States Patent
Kaburagi et al.

(10) Patent No.: US 9,124,382 B2
(45) Date of Patent: Sep. 1, 2015

(54) TRANSMISSION DEVICE, TRANSMISSION SYSTEM, AND METHOD FOR ADJUSTING PASSBAND

(71) Applicant: FUJITSU LIMITED, Kawasaki-shi, Kanagawa (JP)

(72) Inventors: Kenichi Kaburagi, Sapporo (JP); Hiroaki Tomofuji, Sapporo (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/046,319

(22) Filed: Oct. 4, 2013

(65) Prior Publication Data

US 2014/0161448 A1 Jun. 12, 2014

(30) Foreign Application Priority Data

Dec. 6, 2012 (JP) ................................. 2012-266823

(51) Int. Cl.
*H04J 14/00* (2006.01)
*H04J 14/02* (2006.01)

(52) U.S. Cl.
CPC ......... *H04J 14/0204* (2013.01); *H04J 14/0205* (2013.01); *H04J 14/0212* (2013.01); *H04J 14/0221* (2013.01); *H04J 14/0275* (2013.01)

(58) Field of Classification Search
CPC .............. H04J 14/0212; H04J 14/0205; H04J 14/0275; H04J 14/0204; H04J 14/0221; H04Q 11/0003; H04Q 11/00
USPC .......................................... 398/85, 83, 48, 45
See application file for complete search history.

(56) References Cited

U.S. PATENT DOCUMENTS 6,944,406 B1 * 9/2005 Way ............................... 398/196
8,542,999 B2 * 9/2013 Barnard et al. .................. 398/79

FOREIGN PATENT DOCUMENTS

JP 2010-98544 4/2010
JP 2010-098544 * 4/2010 ............. H04B 10/02

* cited by examiner

*Primary Examiner* — M. R. Sedighian
(74) *Attorney, Agent, or Firm* — Staas & Halsey LLP

(57) ABSTRACT

A transmission device includes: a wavelength detector configured to detect a first wavelength of a first optical signal; a wavelength selective switch to which the first optical signal is input; and a controller configured to detect a direction toward which a central wavelength of a passband of the wavelength selective switch is shifted from the first wavelength detected by the wavelength detector and to control the wavelength selective switch so as to increase a width of the passband toward an opposite direction of the direction toward which the central wavelength of the passband is shifted from the first wavelength.

9 Claims, 13 Drawing Sheets

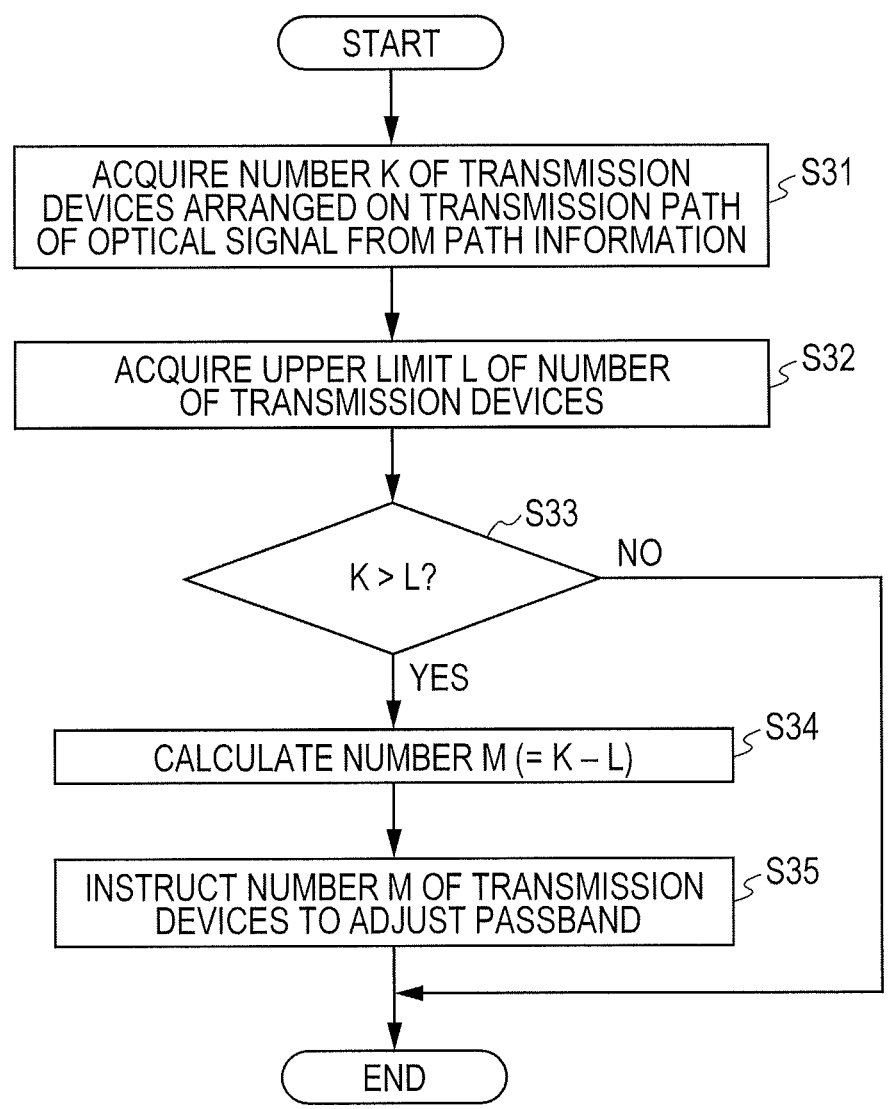

TRANSMISSION DEVICE, TRANSMISSION SYSTEM, AND METHOD FOR ADJUSTING PASSBAND

CROSS-REFERENCE TO RELATED APPLICATION

This application is based upon and claims the benefit of priority of the prior Japanese Patent Application No. 2012-266823, filed on Dec. 6, 2012, the entire contents of which are incorporated herein by reference.

FIELD

The embodiments discussed herein are related to a transmission device, a transmission system, and a method for adjusting a passband.

BACKGROUND

With an increase in demand for communication, optical networks that use wavelength division multiplexing (WDM) are widely used. WDM is a technique for multiplexing a plurality of optical signals with different wavelengths and transmitting the optical signals. For example, WDM enables 88 optical signals to be multiplexed and transmitted as a wavelength multiplexed optical signal (hereinafter referred to as multiplexed optical signal).

As a transmission device using WDM, an optical add-drop multiplexer (OADM) that is referred to as a reconfigurable optical add-drop multiplexer (ROADM) or the like is known. The optical add-drop multiplexer has a transceiver that transmits and receives optical signals. The transceiver is referred to as a transponder or the like.

The optical add-drop multiplexer multiplexes optical signals received from a transceiver and having arbitrary wavelengths and transmits the multiplexed signals to another node. The optical add-drop multiplexer separates an optical signal with an arbitrary wavelength from multiplexed optical signals received from the other node and outputs the optical signal through the transceiver. In other words, the optical add-drop multiplexer adds and drops an optical signal with an arbitrary wavelength.

The optical add-drop multiplexer has an optical amplifier and a wavelength selective switch (WSS) for each path.

The wavelength selective switch selects a specific wavelength from among received multiplexed optical signals and outputs an optical signal with the selected wavelength from an arbitrary port. The wavelength selective switch multiplexes optical signals input from an arbitrary port and outputs the optical signals as a multiplexed optical signal.

The wavelength selective switch has a filter for a passband of which the central wavelength is the selected wavelength (frequency). When a plurality of optical add-drop multiplexers are connected to each other, the width of a passband is reduced due to accumulated errors of the filters, and the spectrums of optical signals are narrowed.

The spectral width of an optical signal depends on a scheme for modulating the optical signal. The higher the bit rate, the larger the spectral width of the optical signal. For example, the spectral width of an optical signal transmitted at a high rate of 40 Gbps, 100 Gbps, or the like is large. When the large spectral width is reduced by filtering at multiple stages, an error rate may increase. Thus, the number of optical add-drop multiplexers that transmit an optical signal while maintaining the quality of the transmission at a certain level is limited.

Regarding narrowing of a spectrum, Japanese Laid-open Patent Publication No. 2010-98544 discloses that if a path is not assigned to wavelengths that are next shorter and longer than a wavelength of a certain path, a passband of a filter for the certain path is maximized for a wavelength selective switch. transmission device

SUMMARY

According to an aspect of the invention, a transmission device includes: a wavelength detector configured to detect a first wavelength of a first optical signal; a wavelength selective switch to which the first optical signal is input; and a controller configured to detect a direction toward which a central wavelength of a passband of the wavelength selective switch is shifted from the first wavelength detected by the wavelength detector and to control the wavelength selective switch so as to increase a width of the passband toward an opposite direction of the direction toward which the central wavelength of the passband is shifted from the first wavelength.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 20 is a flowchart of a process of instructing, by the network management device, a transmission device to adjust a passband of the transmission device.

DESCRIPTION OF EMBODIMENTS

Since the number of optical signals to be multiplexed or the number of wavelengths has been increased in recent years, the difference (error) between the central wavelength of a passband of a filter of a wavelength selective switch and the wavelength (central wavelength) of an optical signal input to the wavelength selective switch may occur. The spectral width of a high-speed signal is large. Thus, if the difference occurs, a side portion of the spectrum may be out of the passband of the wavelength selective switch, and the signal-to-noise (SN) ratio of the optical signal may be reduced.

When the passband is increased in order to avoid the reduction in the SN ratio, not only a signal component included in the optical signal passing through the wavelength selective switch but also a noise component increase. This is due to the fact that amplified spontaneous emission (ASE) light output from an optical amplifier arranged in the wavelength selective switch on the front side passes through the filter due to the increase in the width of the passband. In a network including a plurality of optical add-drop multiplexers, the larger the number of wavelength selective switches through which an optical signal passes, the larger the amount of a noise component to be amplified and the more the SN ratio is reduced.

The following embodiments provide a transmission device, a transmission system, and a method for adjusting a passband which efficiently suppress degradation of an optical signal.

Figure 1:
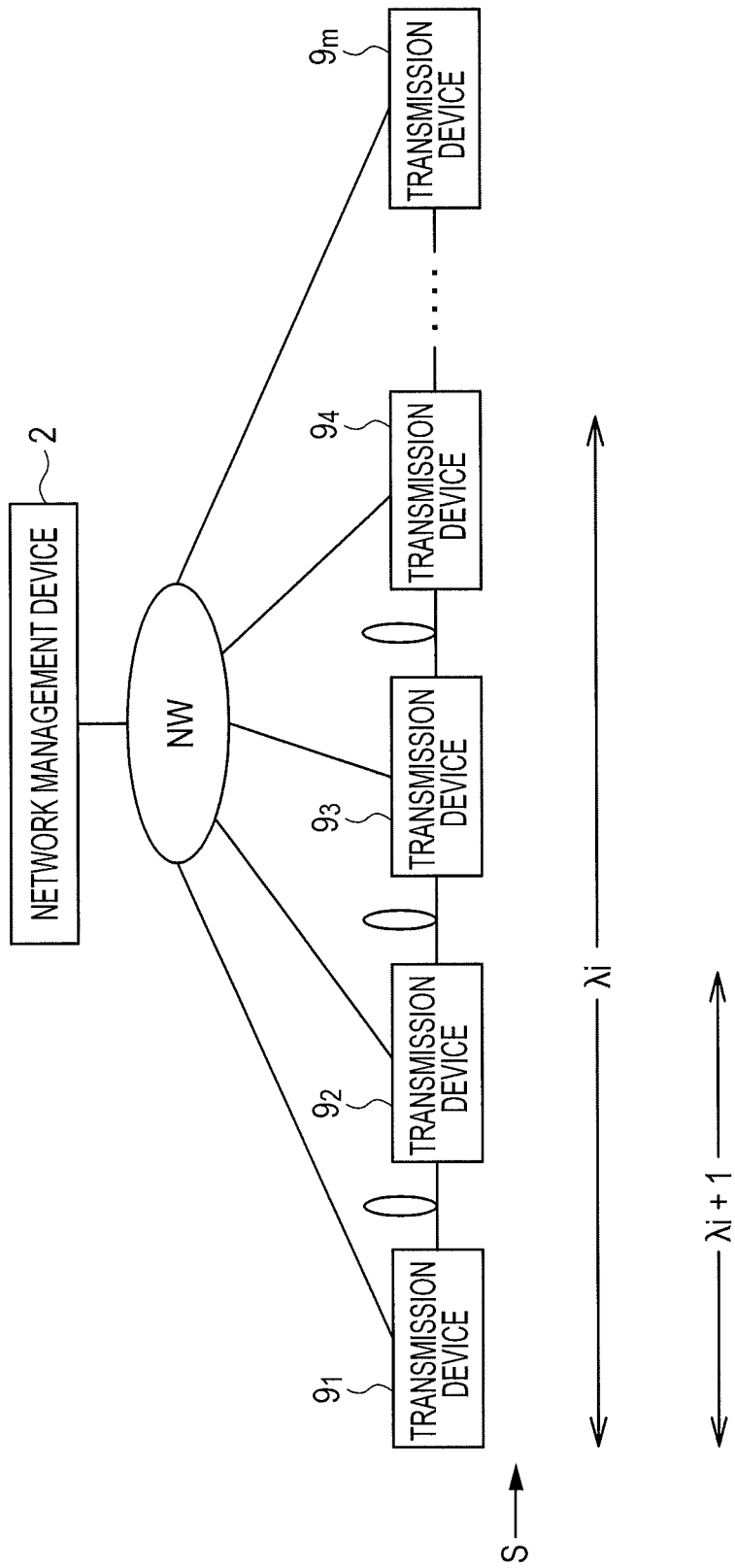
FIG. 1 is a diagram illustrating an example of the configuration of a transmission system.

FIG. 1 is a diagram illustrating an example of the configuration of a transmission system. The transmission system has a plurality of transmission devices $9_1$ to $9_m$ and a network management device 2. The transmission devices $9_1$ to $9_m$ are connected to each other in series by a transmission path (optical fiber). The network management device 2 is connected to the transmission devices $9_1$ to $9_m$ through a monitoring control network (NW). The topology of a transmission network of the transmission devices $9_1$ to $9_m$ is not limited to that illustrated in FIG. 1 and may be a ring topology.

The network management device 2 is a server that has installed therein network management software and manages the plurality of transmission devices $9_1$ to $9_m$. The monitoring control network (NW) is, for example, a local area network (LAN), but may be another network.

The plurality of transmission devices $9_1$ to $9_m$ are arranged in first to m-th nodes of the transmission network, respectively. Each of the transmission devices $9_1$ to $9_m$ multiplexes a plurality of optical signals with different wavelengths and transmits the multiplexed optical signals as a multiplexed optical signal S. The transmission devices $9_1$ to $9_m$ are, for example, optical add-drop multiplexers, but may be wavelength multiplexing transmission devices of another type.

In the transmission system, the optical signals with the wavelengths are transmitted between any two or more of the transmission devices $9_1$ to $9_m$ in accordance with setting by the network management device 2. For example, an optical signal with a wavelength $\lambda i$ may be transmitted from the transmission device $9_1$ to the transmission device $9_4$, and an optical signal with a wavelength $\lambda i+1$ may be transmitted from the transmission device $9_1$ to the transmission device $9_2$.

Figure 2:
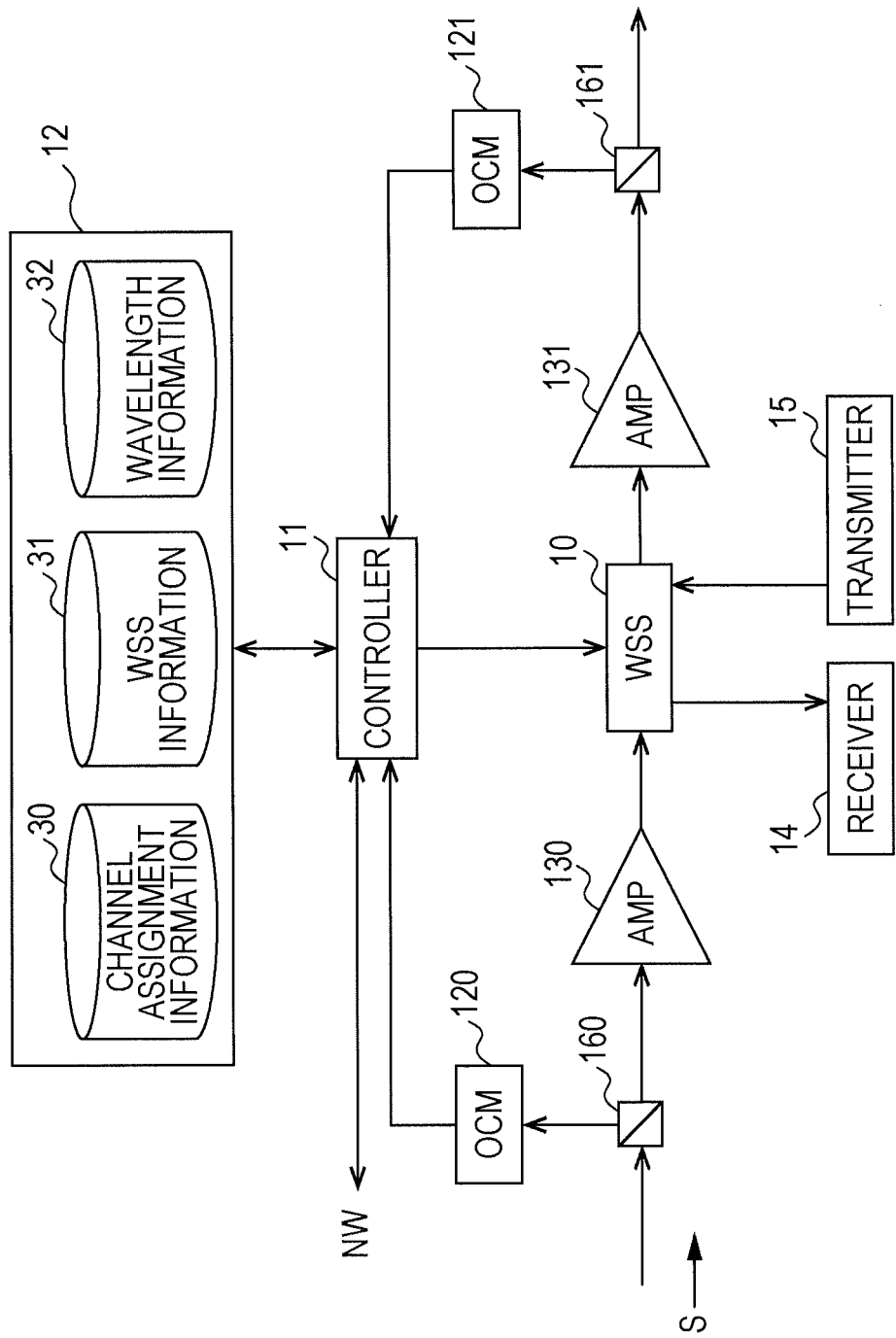
FIG. 2 is a diagram illustrating the configuration of a transmission device according to the embodiments.

FIG. 2 is a diagram illustrating the configuration of each of the transmission devices $9_1$ to $9_m$ according to the embodiments. Each of the transmission devices $9_1$ to $9_m$ has a wavelength selective switch (WSS) 10, a controller 11, a storage unit 12, a first optical amplifier 130, a second optical amplifier 131, a receiver 14, and a transmitter 15. Each of the transmission devices $9_1$ to $9_m$ also has a first optical splitter 160, a second optical splitter 161, a first optical channel monitor (OCM) 120, and a second OCM 121.

When the wavelength multiplexed optical signal S is input to any of the transmission devices $9_1$ to $9_m$, the wavelength multiplexed optical signal S passes through the first optical splitter 160, the first optical amplifier 130, the WSS 10, the second optical amplifier 131, and the second optical splitter 161 in this order and output from the transmission device. The first optical splitter 160 splits the multiplexed optical signal S and outputs the multiplexed optical signal S to the first OCM 120 and the first optical amplifier 130.

The first optical amplifier 130 amplifies the multiplexed optical signal S and outputs the amplified multiplexed optical signal S to the WSS 10. For example, the first optical amplifier 130 amplifies the multiplexed optical signal S by causing an erbium-doped fiber to be in an excited state using excitation light.

The WSS 10 separates the multiplexed optical signal S into the optical signals with the wavelengths and outputs an optical signal to be dropped to the receiver 14. The WSS 10 receives an optical signal to be added from the transmitter 15, multiplexes the received optical signal and a passing optical signal and outputs the multiplexed optical signals as a multiplexed optical signal S to the second optical amplifier 131. The passing optical signal is an optical signal that is not added and dropped in the transmission devices $9_1$ to $9_m$ and is transmitted to a transmission device that is included in an adjacent node and among the transmission devices $9_1$ to $9_m$.

The second optical amplifier 131 amplifies the multiplexed optical signal S and outputs the amplified multiplexed optical signal S to the second optical splitter 161. For example, the second optical amplifier 131 amplifies the multiplexed optical signal S by causing an erbium-doped fiber to be in an excited state using excitation light.

The second optical splitter 161 splits the multiplexed optical signal S and outputs the multiplexed optical signal S to the second OCM 121 and the transmission path.

The controller 11 is an arithmetic processing circuit such as a central processing unit (CPU), for example. The controller 11 controls the transmission devices $9_1$ to $9_m$ on the basis of a predetermined program. The controller 11 communicates with the network management device 2 through the monitoring control network NW. The controller 11 is not limited to the controller that functions on the basis of the software. The controller 11 may be a controller that functions on the basis of hardware such as an application specific integrated circuit.

The storage unit 12 is, for example, a memory and stores channel assignment information 30 that indicates assignments of optical signals with wavelengths to channels. The controller 11 references the channel assignment information 30 and sets the wavelengths in the WSS 10. The channel assignment information 30 indicates the assignments of the optical signals with the wavelengths (frequencies) to channel numbers CH1 to CHn. The channel assignment information 30 is transmitted by the network management device 2 to the controller 11 and stored in the storage unit 12.

Figure 3:
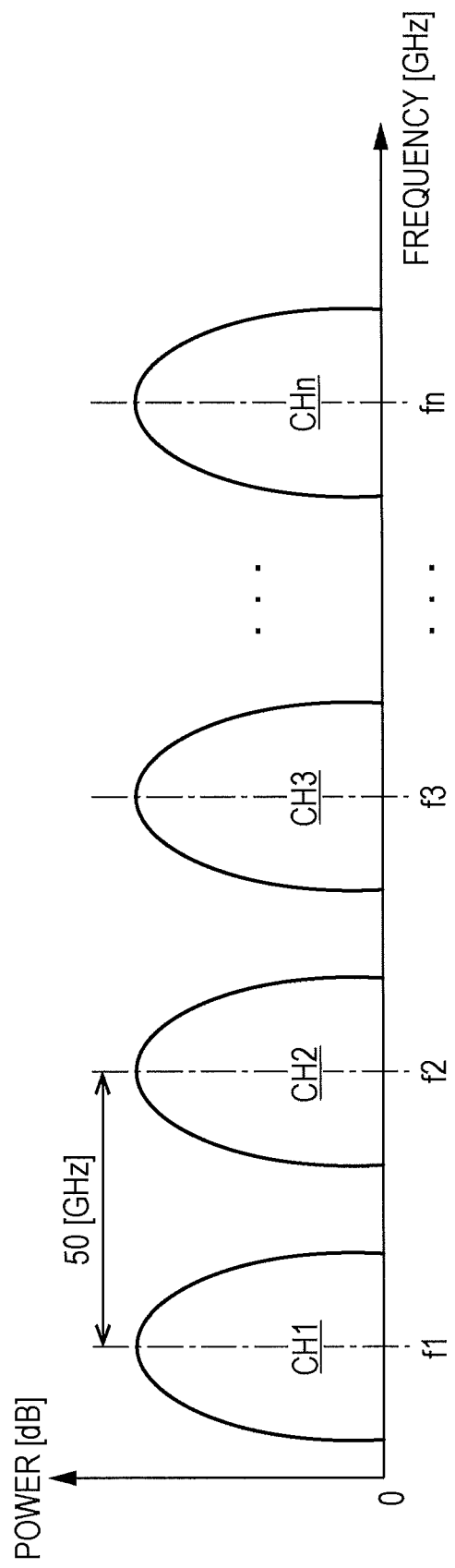
FIG. 3 is a diagram illustrating the spectrum of an optical signal for each of frequencies.

FIG. 3 illustrates the spectrums of the optical signals with the frequencies. In FIG. 3, the abscissa indicates a frequency (GHz) and the ordinate indicates the power (dB) of an optical signal. For example, optical signals with frequencies f1 to fn are assigned to channels CH1 to CHn spaced at intervals of 50 GHz, respectively. The intervals are referred to as ITU-T grids and compliant with an international standard. ITU-T stands for International Telecommunication Union Telecommunication Standardization Sector.

The storage unit 12 stores WSS information 31 that indicates the central wavelength $\lambda i$ (i=1 to n) of a passband of a filter of the WSS 10 for each of the channels CH1 to CHn. The WSS information 31 is information specific to each of the transmission devices $9_1$ to $9_m$. The WSS information 31 is generated in advance on the basis of data actually measured with the WSS 10 or design data.

The storage unit 12 stores wavelength information 32 that indicates the wavelengths $\lambda i$ of the optical signals included in the multiplexed optical signal S. The controller 11 acquires the wavelength information 32 from the first OCM 120 and the second OCM 121 and causes the wavelength information 32 to be stored in the storage unit 12.

The first OCM 120 and the second OCM 121 function as wavelength detectors that detect the wavelengths $\lambda i$ of the optical signals included in the multiplexed optical signal S. The first OCM 120 detects the wavelengths of the multiplexed optical signal S to be input to the WSS 10, while the second OCM 121 detects wavelengths of the multiplexed optical signal S output from the WSS 10. Thus, each of the transmission devices $9_1$ to $9_m$ detects not only the wavelength of the passing optical signal but also the wavelengths of optical signals added and dropped.

Figure 4:
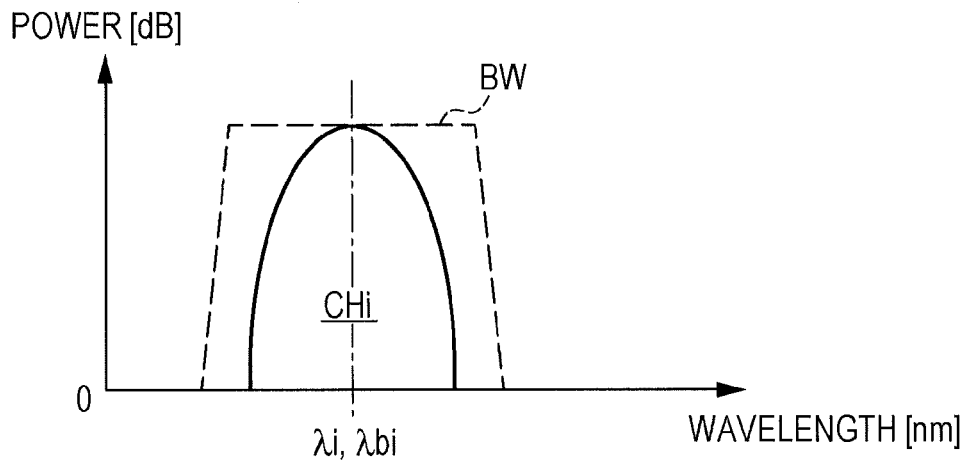
FIG. 4 is a diagram illustrating the spectrum of an optical signal and a passband when the wavelength of the optical signal matches the central wavelength of the passband of a filter of a wavelength selective switch.

FIG. 4 illustrates the spectrum of an optical signal and a passband BW when the wavelength of the optical signal matches the central wavelength of the passband BW of the filter of the WSS 10. In FIG. 4, the abscissa indicates a wavelength, and the ordinate indicates the power (dB) of the optical signal. The spectrum is indicated by a solid line and the passband BW is indicated by a dotted line. The same applies to the other drawings to be referenced for the following description.

As illustrated in FIG. 4, when there is no difference between the wavelength (central wavelength) $\lambda i$ of the optical signal and the central wavelength $\lambda bi$ of the passband BW, spaces between the passband BW and the spectrum of the optical signal may be maintained on the long wavelength side (right side of the sheet of FIG. 4) and short wavelength side (left side of the sheet of FIG. 4) with respect to the central wavelength $\lambda bi$. Thus, the optical signal of a corresponding channel CHi is output from the WSS 10 without being degraded.

Figure 5:
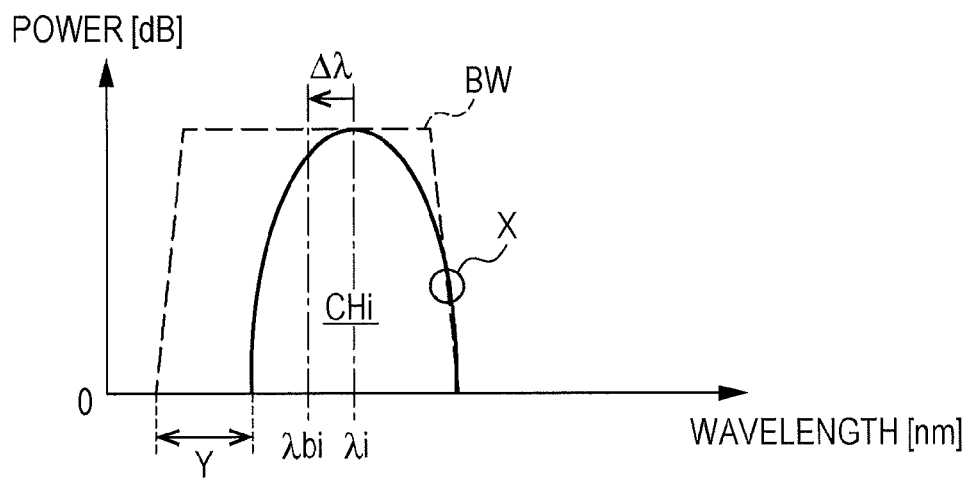
FIG. 5 is a diagram illustrating the spectrum of the optical signal and the passband when the wavelength of the optical signal is shifted from the central wavelength of the passband of the filter of the wavelength selective switch.

FIG. 5 illustrates the spectrum of the optical signal and the passband BW when the wavelength $\lambda i$ of the optical signal is shifted from the central wavelength $\lambda bi$ of the passband BW of the filter of the WSS 10. In FIG. 5, the central wavelength $\lambda bi$ of the passband BW is shifted by an error $\Delta\lambda$ from the wavelength $\lambda i$ of the optical signal on the short wavelength side. Thus, there is a space Y between the passband BW and the spectrum of the optical signal on the short wavelength side with respect to the central wavelength $\lambda bi$.

A part of the spectrum on the long wavelength side is out of the passband BW (refer to a symbol X). Thus, the optical signal, output from the WSS 10, of the channel CHi is degraded, compared with the optical signal before the optical signal is input to the WSS 10.

The degradation of the optical signal due to the error between the wavelengths is caused by the fact that the spectral width is increased due to an increase in a transmission rate and the frequency spaces between the channels are reduced due to an increase in the number of wavelengths, for example. For example, in a case that a baud rate of data of a coherent optical signal of 100 GHz is 25 GHz, it is difficult to say that ITU-T grids are sufficiently wide spaces.

First Embodiment

Figure 6:
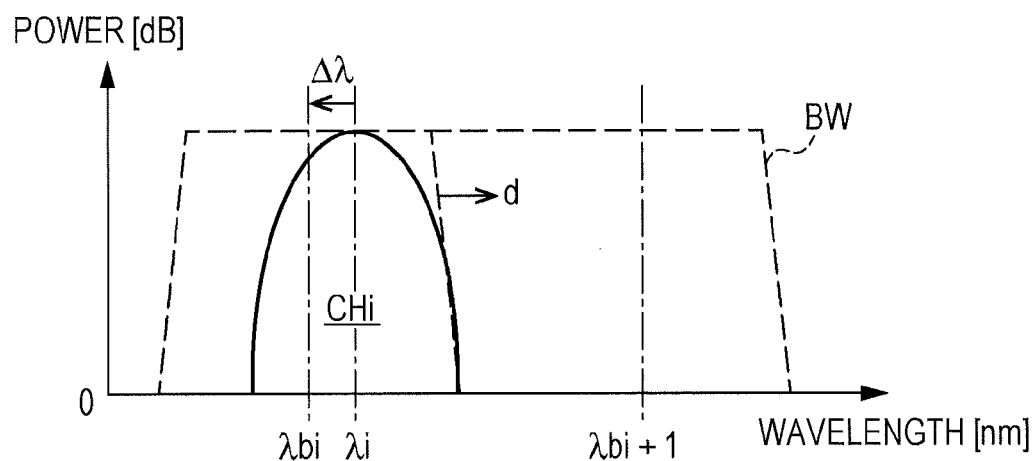
FIG. 6 is a diagram illustrating the spectrum of the optical signal and the passband when the passband is increased by one channel toward a long wavelength side direction.

The transmission devices $9_1$ to $9_m$ according to the first embodiment inhibits degradation of an optical signal by increasing the width of the passband BW on the basis of a direction toward which the central wavelength $\lambda bi$ of the passband BW is shifted from the wavelength $\lambda i$ of the detected optical signal. FIG. 6 illustrates the spectrum of the optical signal and the passband BW when the passband BW is increased by one channel toward the long wavelength side direction.

The controller 11 detects a direction toward which the central wavelength $\lambda bi$ of the passband BW of the filter of the WSS 10 is shifted by an error $\Delta\lambda$ from the wavelength $\lambda i$ detected by the first OCM 120 or the second OCM 121. Specifically, the controller 11 references the WSS information 31 and the wavelength information 32, determines a magnitude relationship between the wavelength $\lambda i$ and the central wavelength $\lambda bi$, and detects the direction toward which the central wavelength $\lambda bi$ of the passband BW is shifted. In the case illustrated in FIG. 6, it is apparent that the central wavelength $\lambda bi$ of the passband BW is shifted by the error $\Delta\lambda$ from the wavelength $\lambda i$ of the optical signal toward the short wavelength side direction.

Next, the controller 11 controls the WSS 10 so that the width of the passband BW is increased toward the opposite direction of the direction toward which the central wavelength $\lambda bi$ of the passband BW is shifted. In the case illustrated in FIG. 6, the width of the passband BW is increased toward the long wavelength side direction d. The increased width is equal to the width of a passband of a channel CHi+1 that is adjacent to the channel CHi to which the wavelength $\lambda i$ is assigned. In this case, it is assumed that an optical signal with a corresponding wavelength is not assigned to the adjacent channel CHi+1.

The WSS 10 adjusts the angle of a micro mirror included in the WSS 10 and thereby sets attenuation (loss) of an optical signal for each of channels CHi, for example. The controller 11 outputs a control signal for controlling the attenuation to the WSS 10 and thereby controls the width of the passband BW so as to increase the width of the passband BW. In the case illustrated in FIG. 6, the controller 11 sets attenuation of an optical signal of the adjacent channel CHi+1 to the minimum value or a sufficient small value and thereby releases the passband (central wavelength $\lambda bi+1$) corresponding to the adjacent channel CHi+1 so as to enable the passband corresponding to the adjacent channel CHi+1 to be used. Note that the passband that corresponds to the channel CHi to which an optical signal is already assigned is released by the controller 11 in advance without an increase in the width of the passband corresponding to the channel CHi.

The spectrum of the optical signal with the wavelength $\lambda i$ is set within the range of the passband BW of the filter by increasing the width of the passband BW, unlike the case illustrated in FIG. 5. Thus, the optical signal of the channel CHi is output from the WSS 10 without being degraded.

Figure 7:
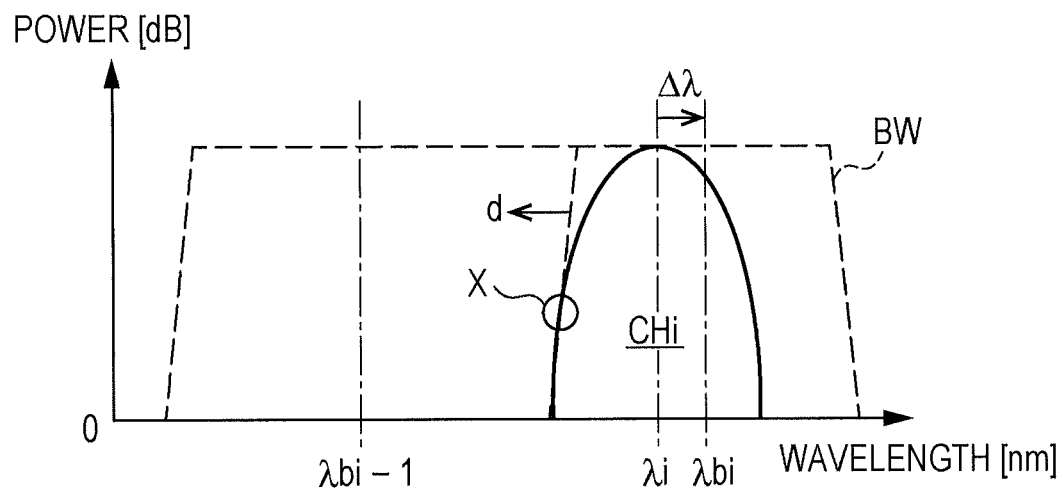
FIG. 7 is a diagram illustrating the spectrum of the optical signal and the passband when the passband is increased by one channel toward a short wavelength side direction.

FIG. 7 illustrates the spectrum of the optical signal and the passband BW when the passband BW is increased by one channel toward the short wavelength side direction. In this case, the central wavelength $\lambda bi$ of the passband BW is shifted by an error $\Delta\lambda$ from the wavelength $\lambda i$ of the optical signal toward the long wavelength side direction, and a part of the spectrum on the longer wavelength side is out of the range of the passband BW (refer to a symbol X).

Thus, the width of the passband BW is increased by one channel toward the short wavelength side direction d that is the opposite direction of the direction toward which the central wavelength $\lambda bi$ of the passband BW is shifted. In this case, the controller 11 controls the WSS 10 so as to release a passband (central wavelength $\lambda bi-1$) of a channel CHi−1 on the opposite side of the adjacent channel CHi+1 illustrated in FIG. 6. The optical signal of the channel CHi is output from the WSS 10 without being degraded in the same way as the case illustrated in FIG. 6. It is assumed that an optical signal with a corresponding wavelength is not assigned to the adjacent channel CHi−1.

If the optical signals with the wavelengths $\lambda i+1$ and $\lambda i-1$ are not assigned to the channels CHi+1 and CHi−1 adjacent to the channel CHi to which the optical signal with the wavelength $\lambda i$ is assigned, the controller 11 releases the passbands corresponding to the adjacent channels CHi+1 and CHi−1 so as to enable the passbands corresponding to the adjacent channels CHi+1 and CHi−1 to be used and thereby increases the width of the passband BW.

Figure 8:
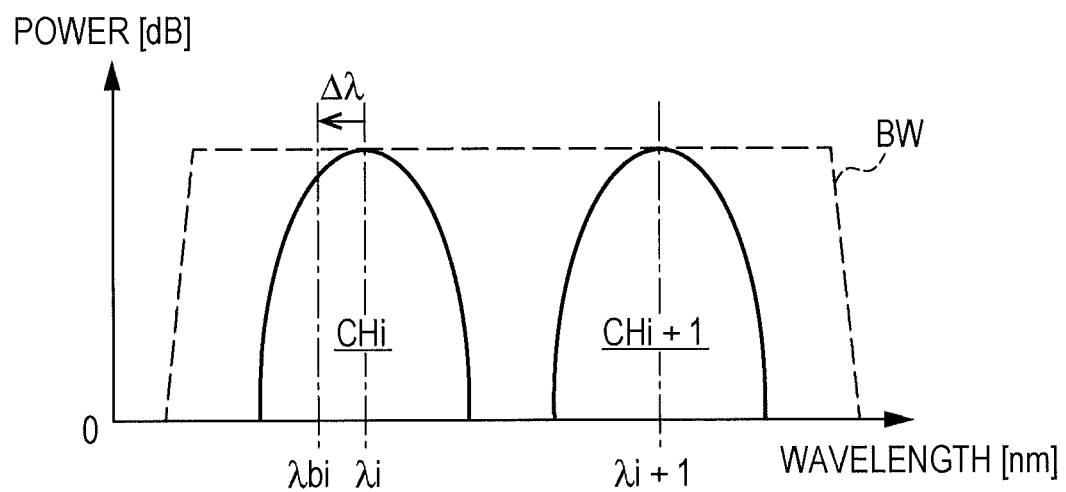
FIG. 8 is a diagram illustrating the spectrums of optical signals of two adjacent channels and the passband.

If the optical signals are assigned to the adjacent channels CHi+1 and CHi−1, and the controller 11 detects the error $\Delta\lambda$ of the central wavelength $\lambda bi$ of the passband BW, the controller 11 does not execute the aforementioned process of increasing the width of the passband BW. FIG. 8 illustrates the spectrums of the optical signals of the two adjacent channels CHi and CHi+1 and the passband BW. In the case illustrated in FIG. 8, the passbands that correspond to the channels CHi and CHi+1 are combined so as to form the passband BW of which the width is larger than the widths of the passbands. The passband that corresponds to the channels CHi and CHi+1 is released by assigning the wavelengths $\lambda i+1$ and $\lambda i-1$ to the channels CHi and CHi+1.

As illustrated in FIG. 8, even when the central wavelength $\lambda bi$ of the passband of the channel CHi is shifted from the wavelength $\lambda i$ of the optical signal toward the short wavelength side direction, the spectrum of the optical signal with the wavelength $\lambda i$ is in the range of the passband W. Thus, the optical signal of the channel CHi is output from the WSS 10 without being degraded. The same applies to the case where the central wavelength $\lambda bi$ of the passband of the channel CHi is shifted toward the long wavelength side direction and the optical signal is applied to the adjacent channel CHi−1 on the short wavelength side.

Figure 9:
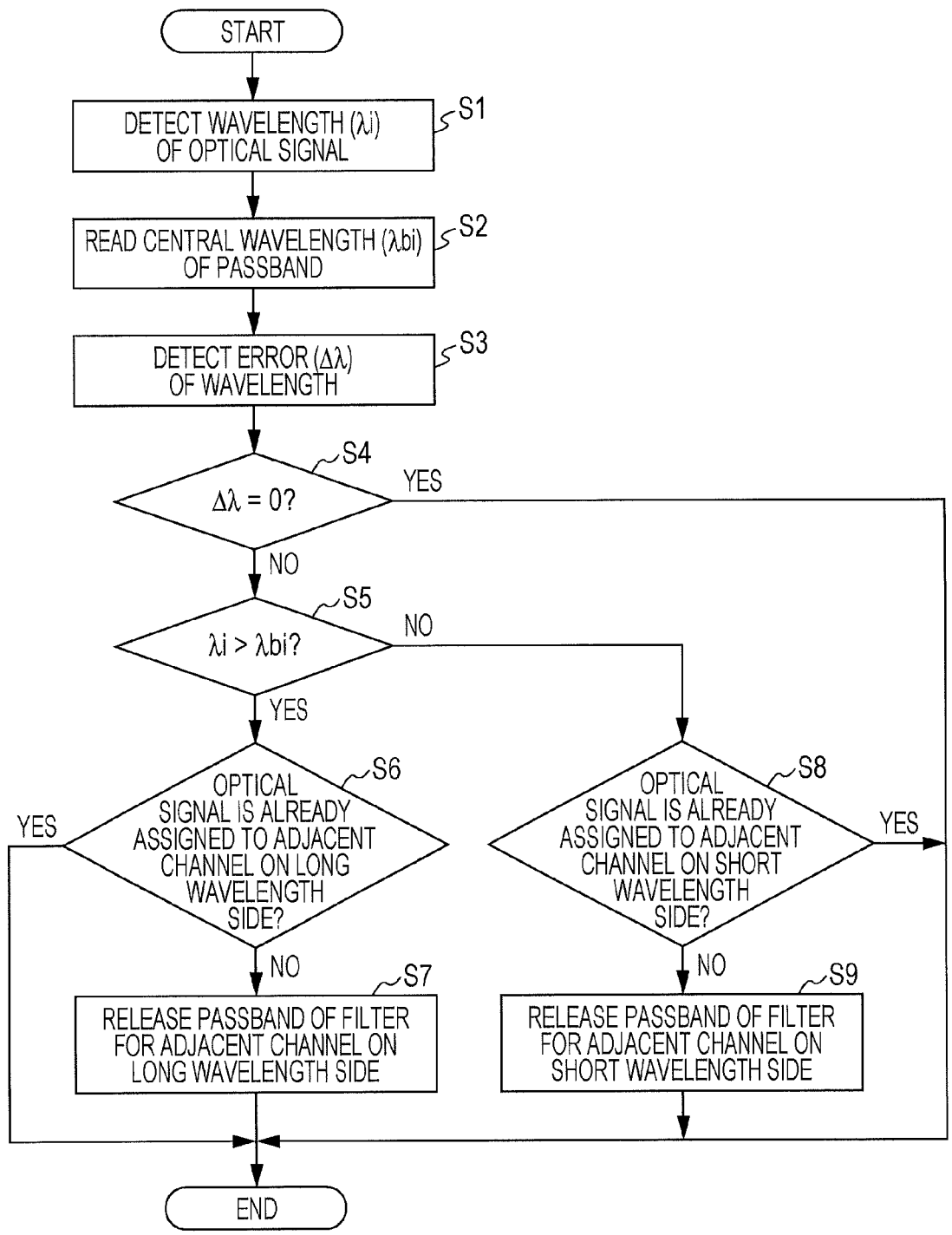
FIG. 9 is a flowchart of an example of a process of adjusting the passband.

Next, a method for adjusting the passband of the WSS 10 is described with reference to FIG. 9. FIG. 9 is a flowchart of an example of a process of adjusting the passband.

First, the first OCM 120 and the OCM 121 detect the wavelengths $\lambda i$ of the optical signals included in the multiplexed optical signal S (in operation S1). The detected wavelengths $\lambda i$ are stored as the wavelength information 32 in the storage unit 12.

Next, the controller 11 references the WSS information 31 stored in the storage unit 12 and reads the central wavelength $\lambda bi$ of the passband of the WSS 10 (in operation S2). The controller 11 detects an error $\Delta\lambda$ between the central wavelength $\lambda bi$ and each of the detected wavelengths $\lambda i$ (in operation S3).

If the error $\Delta\lambda$ is 0 (Yes in operation S4), the controller 11 terminates the process. If the error is not 0 (No in operation S4), the controller 11 determines a magnitude relationship between the wavelength $\lambda i$ and the central wavelength $\lambda bi$ (in operation S5).

If $\lambda i > \lambda bi$ (Yes in operation S5), the controller 11 references the channel assignment information 30 and determines whether or not an optical signal is already assigned to the channel CHi+1 that is adjacent to the channel CHi on the long wavelength side (in operation S6). If the optical signal is not assigned (No in operation S6), the controller 11 releases the passband corresponding to the channel CHi+1 adjacent to the channel CHi on the long wavelength side so as to enable the passband corresponding to the channel CHi+1 to be used (in operation S7). If the optical signal is already assigned (Yes in operation S6), the controller 11 terminates the process.

If $\lambda i < \lambda bi$ (No in operation S5), the controller 11 references the channel assignment information 30 and determines whether or not an optical signal is already assigned to the channel CHi−1 that is adjacent to the channel CHi on the short wavelength side (in operation S8). If the optical signal is not assigned (No in operation S8), the controller 11 releases the passband corresponding to the channel CHi−1 adjacent to the channel CHi on the short wavelength side so as to enable the passband corresponding to the channel CHi−1 to be used (in operation S9). If the optical signal is already assigned (Yes in operation S8), the controller 11 terminates the process. In this manner, the process of adjusting the passband is executed.

Next, an application example of the method for adjusting the passband is described below using the optical signals with the wavelengths $\lambda i$ and $\lambda i+1$ illustrated in FIG. 1. FIGS. 10 to 13 illustrate examples of the spectrums of optical signals output from the transmission devices $9_1$ to $9_4$ of the first to fourth nodes included in the network illustrated in FIG. 1 and the passband BW. In the examples, the central wavelength $\lambda bi$ of the passband BW corresponding to the channel CHi is shifted from the wavelength $\lambda i$ of the optical signal on the short wavelength side as illustrated in FIG. 5.

Figure 10:
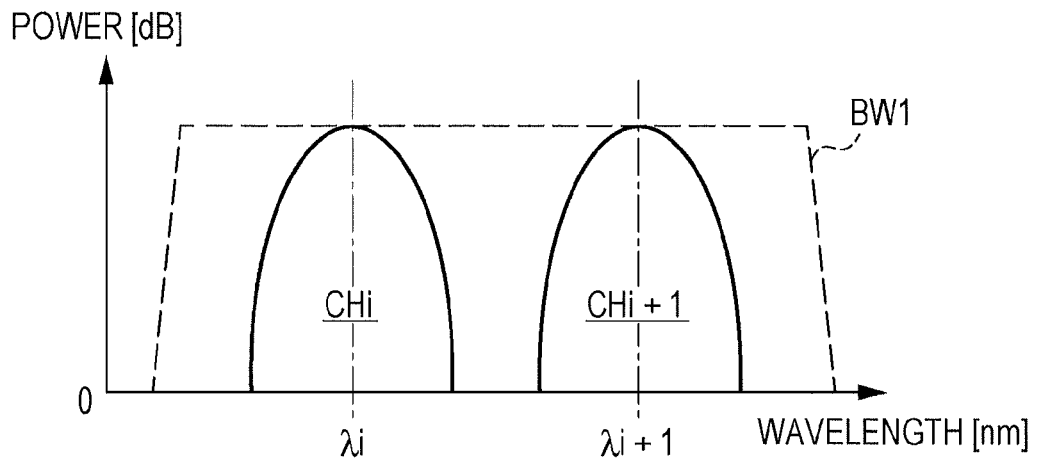
FIG. 10 is a diagram illustrating an example of the spectrums of optical signals output from a transmission device of a first node included in a network illustrated in FIG. 1 and a passband.

The transmission device $9_1$ transmits the optical signals having the wavelengths $\lambda i$ and $\lambda i+1$ and assigned to the adjacent channels CHi and CHi+1. Thus, the filter of the WSS 10 of the transmission device $9_1$ has a passband BW1 obtained by combining the passbands of the channels CHi and CHi+1 as illustrated in FIG. 10.

Figure 11:
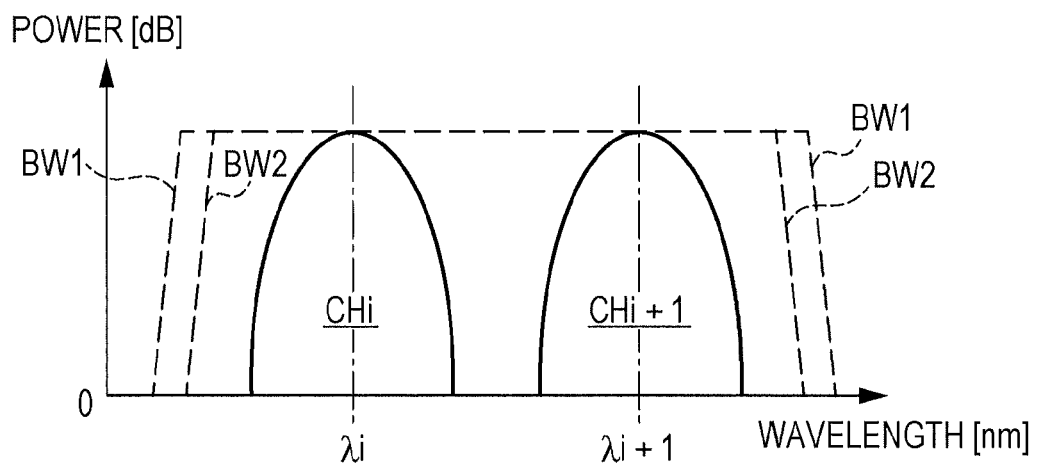
FIG. 11 is a diagram illustrating an example of the spectrums of optical signals output from a transmission device of a second node included in the network illustrated in FIG. 1 and passbands.

The transmission device $9_2$ transmits the optical signals having the wavelengths $\lambda i$ and $\lambda i+1$ and assigned to the adjacent channels CHi and CHi+1. Thus, the filter of the WSS 10 of the transmission device $9_2$ has a passband BW2 obtained by combining the passbands of the channels CHi and CHi+1 as illustrated in FIG. 11. The width of the passband BW2 is smaller than the width of the passband BW1 since the spectrums of the optical signals are narrowed between the transmission devices $9_1$ and $9_2$.

Figure 12:
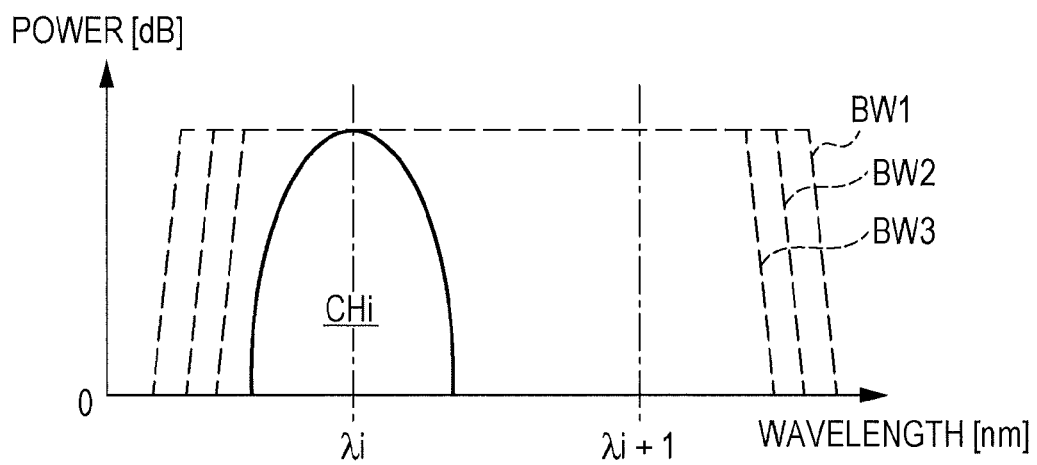
FIG. 12 is a diagram illustrating an example of the spectrums of optical signals output from a transmission device of a third node included in the network illustrated in FIG. 1 and passbands.

The transmission device $9_3$ branches the optical signals to obtain the optical signal with the wavelength $\lambda i+1$ and transmits the optical signal with the wavelength $\lambda i$. The filter of the WSS 10 of the transmission device $9_3$ has a passband BW obtained by releasing the passband of the channel CHi+1 that is adjacent to the channel CHi on the long wavelength side as illustrated in FIG. 12. The width of the passband BW3 is smaller than the widths of the passbands BW1 and BW2 since the spectrums of the optical signals are narrowed between the transmission devices $9_1$ and $9_3$.

Figure 13:
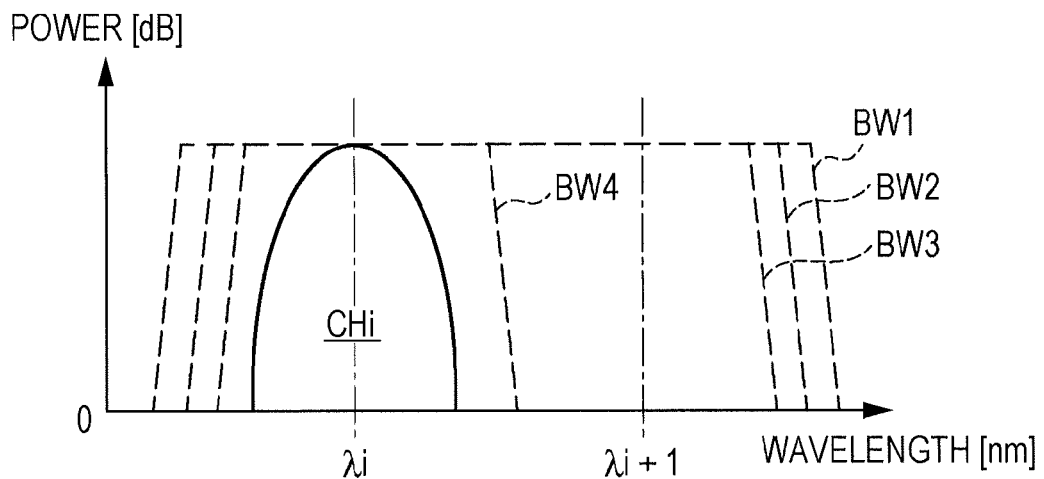
FIG. 13 is a diagram illustrating an example of the spectrums of optical signals output from a transmission device of a fourth node included in the network illustrated in FIG. 1 and passbands.

The transmission device $9_4$ transmits the optical signal with the wavelength λi. The filter of the WSS 10 of the transmission device $9_4$ has a passband BW4 obtained by releasing the passband of the channel CHi+1 that is adjacent to the channel CHi on the long wavelength side as illustrated in FIG. 13. The width of the passband BW4 is smaller than the widths of the passbands BW1, BW2, and BW3 since the spectrums of the optical signals are narrowed between the transmission devices $9_1$ and $9_4$.

In this manner, the passband of the channel CHi is increased by combining the passband of the channel CHi with the passband for the optical signal assigned to the adjacent channel CHi+1 in a transmission section between the transmission devices $9_1$ and $9_2$. In addition, in a transmission section between the transmission devices $9_3$ and $9_4$, the passband of the channel CHi is increased by releasing the passband corresponding to the adjacent channel CHi+1 to which an optical signal is not assigned. Thus, the optical signal of the channel CHi is transmitted between the transmission devices $9_1$ and $9_4$ without being degraded.

When the passband is increased, not only a signal component that passes through the WSS 10 but also a noise component that is caused by ASE light and output from the optical amplifiers 130 and 131 increase. The ASE light is output from an amplification medium such as an erbium-doped fiber when the amplification medium is changed to an excited state by excitation light.

Figure 14:
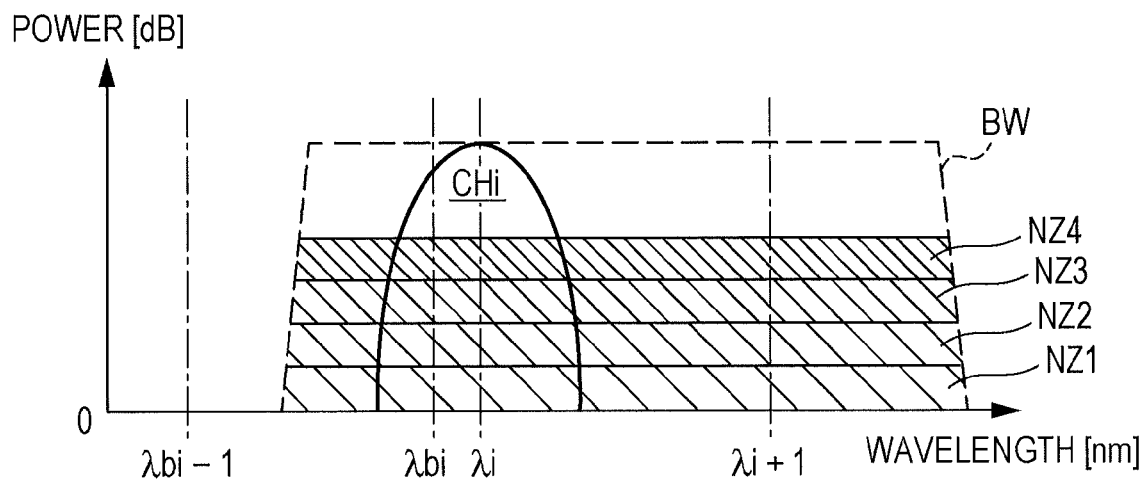
FIG. 14 is a diagram illustrating the spectrum of the optical signal, the passband, and noise components in the first embodiment.

FIG. 14 illustrates the spectrum of the optical signal, the passband, and noise components in the first embodiment. In FIG. 14, the spectrum of the optical signal, the passband BW, and the noise components NZ1 to NZ4 are in the illustrated states when the optical signal with the wavelength λi is branched by the transmission device $9_3$. Note that the passband BW is increased by the adjacent channel CHi+1 on the long wavelength side.

The noise components NZ1 to NZ4 that correspond to the width of the passband BW pass through the WSS 10, together with a signal component of the optical signal. The noise component NZ1 is generated by the first optical amplifier 130 of the transmission device $9_3$. The noise components NZ2 and NZ3 are generated by the second optical amplifier 131 and first optical amplifier 130 of the transmission device $9_2$, respectively. The noise component NZ4 is generated by the second optical amplifier 131 of the transmission device $9_1$.

Accordingly, the noise components NZ1 to NZ4 are accumulated as the optical signal passes through the first and second optical amplifiers 130 and 131. Thus, the larger the number of the optical amplifiers 130 and 131 through which the optical signal passes, the larger the amount of noise components superimposed on the optical signal and the more the optical signal is degraded. The power of the noise components NZ1 to NZ4 is represented by the areas of noise regions (spectrums of the noise) illustrated in FIG. 14. The power of the signal component is indicated by Ps (W), the power of the noise components NZ1 to NZ4 is indicated by Pn (W), and the ratio of the power Ps to the power Pn is calculated by the following Equation (1).

$$Ps/Pn=(G\times Pin)/\{NF\times(G-1)\times h\times v\times B\} \quad \text{Equation (1)}$$

In Equation (1), G is the amplification rate of the first and second optical amplifiers 130 and 131, Pin is the power (W) of the optical signal input to the first and second optical amplifiers 130 and 131, B is a bandwidth (m) of the first and second amplifiers 130 and 131, NF is a noise factor, h is a Planck's constant (m²·kg/s), and v is the frequency (the speed of light/the wavelength of the light) (Hz) of light.

Figure 15:
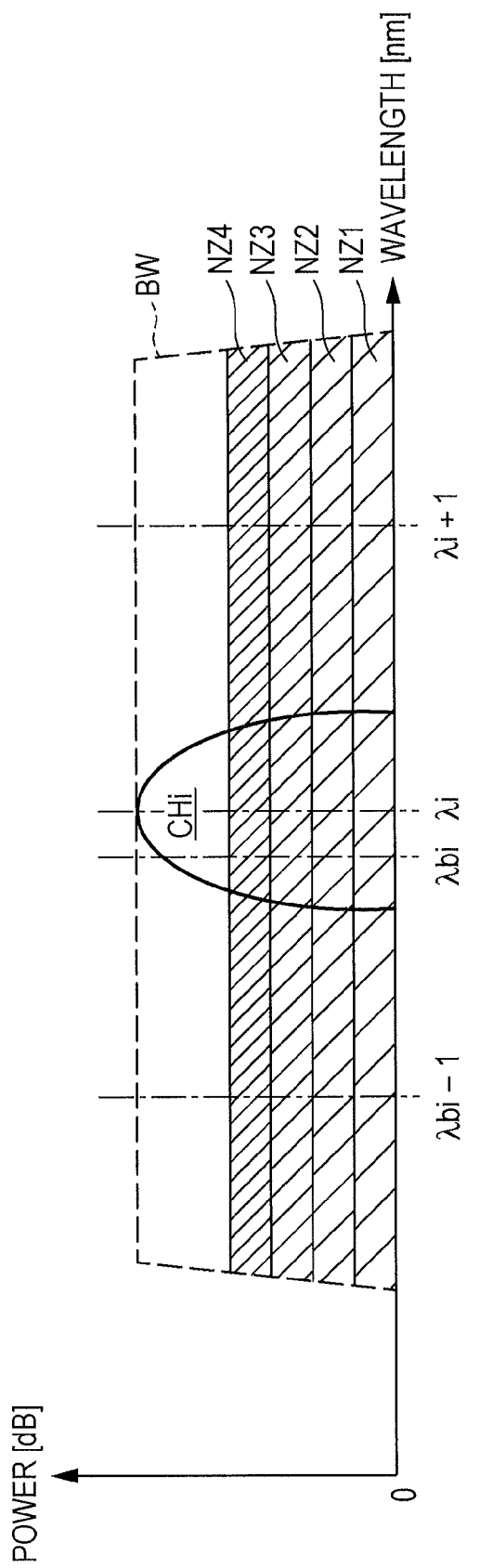
FIG. 15 is a diagram illustrating the spectrum of an optical signal, a passband, and noise components in a conventional example.

FIG. 15 illustrates the spectrum of the optical signal, the passband, and noise components according to the technique disclosed in Japanese Laid-open Patent Publication No. 2010-98544.

According to the conventional technique, when a path is not assigned to wavelengths that are next shorter and longer than a wavelength of a certain path, a passband of a filter for the certain path is maximized for a wavelength selective switch. In the case illustrated in FIG. 15, since the passbands of the channels that are adjacent to the channel CHi on both long and short wavelength sides are released, the power of the noise components NZ1 to NZ4 is larger, compared with the case illustrated in FIG. 14. On the other hand, the transmission devices $9_1$ to $9_m$ according to the first embodiment increase the width of the passband only toward the opposite direction of the direction toward which the central wavelength of the passband is shifted, reduce the power of the noise components NZ1 to NZ4, and efficiently suppress degradation of the optical signal.

Second Embodiment

Figure 16:
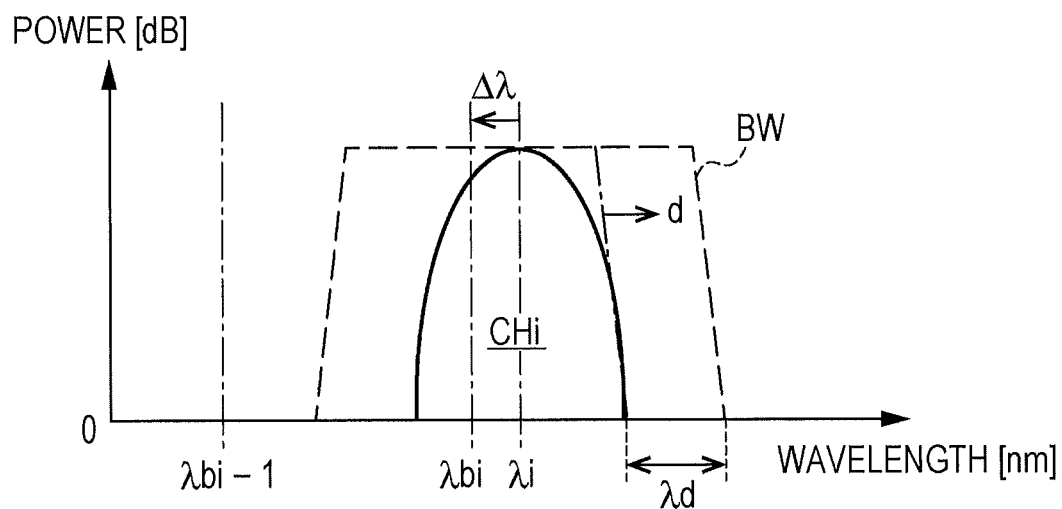
FIG. 16 is a diagram illustrating the spectrum of the optical signal and the passband when the passband is increased toward the long wavelength side direction on the basis of shifting of the central wavelength of the passband.

In order to further efficiently suppress degradation of the optical signal, the width of the passband BW may be increased on the basis of the error Δλ of the central wavelength of the passband BW. FIG. 16 illustrates the spectrum of the optical signal and the passband BW when the passband BW is increased toward the long wavelength side direction on the basis of the error Δλ of the central wavelength of the passband BW.

In the second embodiment, a switch that has liquid crystal on silicon (LCOS) is used as the WSS 10. The WSS 10 that has the LCOS may freely control the width of the passband of the filter by controlling the LCOS on a pixel basis regardless of grids (refer to FIG. 3) between fixed wavelengths (frequencies). The WSS 10 is not limited to the liquid crystal type and may be of a digital light processing (DLP) type.

First, the controller 11 detects the error Δλ. The error Δλ is the difference between the central wavelength λbi of the passband BW and the wavelength λi of the optical signal. Thus, the error Δλ is calculated by the following Equation (2).

$$\Delta\lambda=|\lambda bi-\lambda i| \quad \text{Equation (2)}$$

Next, the controller 11 determines an adjustment value λd on the basis of the error Δλ. The adjustment value λd is a width to be increased. The adjustment value λd is calculated by the following Equation (3), for example.

$$\lambda d=\alpha\times\Delta\lambda \quad \text{Equation (3)}$$

In Equation (3), α is a predetermined value and determined on the basis of a margin of the width of the passband for the width of the spectrum of the optical signal, for example.

As illustrated in FIG. 16, the central wavelength λbi of the passband BW is shifted by the error Δλ from the wavelength λi of the optical signal on the short wavelength side. Thus, the width of the passband BW is increased by the adjustment value λd toward the long wavelength side direction d. The width to be increased, therefore, may be reduced, compared with the widths illustrated in FIGS. 14 and 15.

Figure 17:
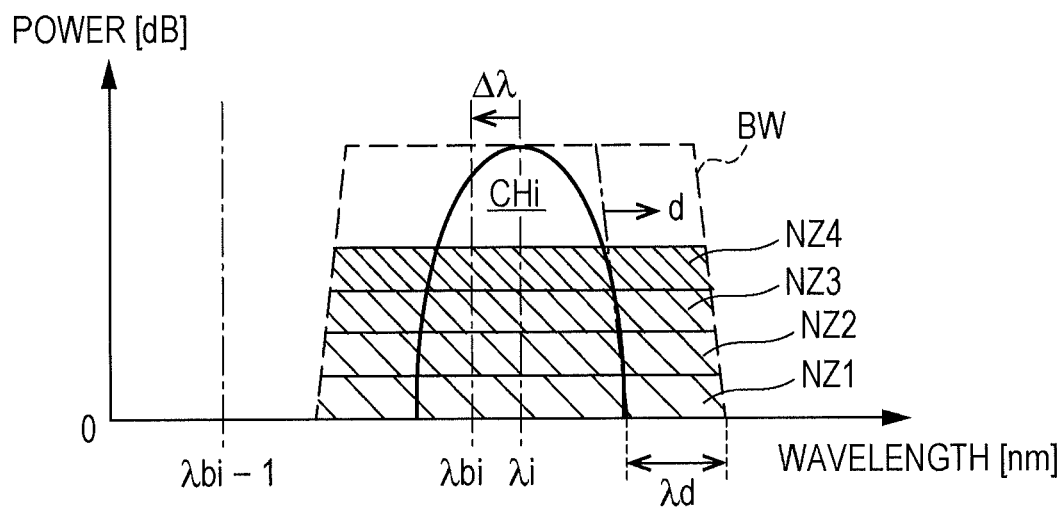
FIG. 17 is a diagram illustrating the spectrum of the optical signal, the passband, and noise components in the second embodiment.

FIG. 17 illustrates the spectrum of the optical signal, the passband BW, and noise components NZ1 to NZ4 in the second embodiment. Since the passband BW is increased by the appropriate width λd on the basis of the error Δλ the power of the noise components NZ1 to NZ4 is reduced, compared with the cases illustrated in FIGS. 14 and 15.

Figure 18:
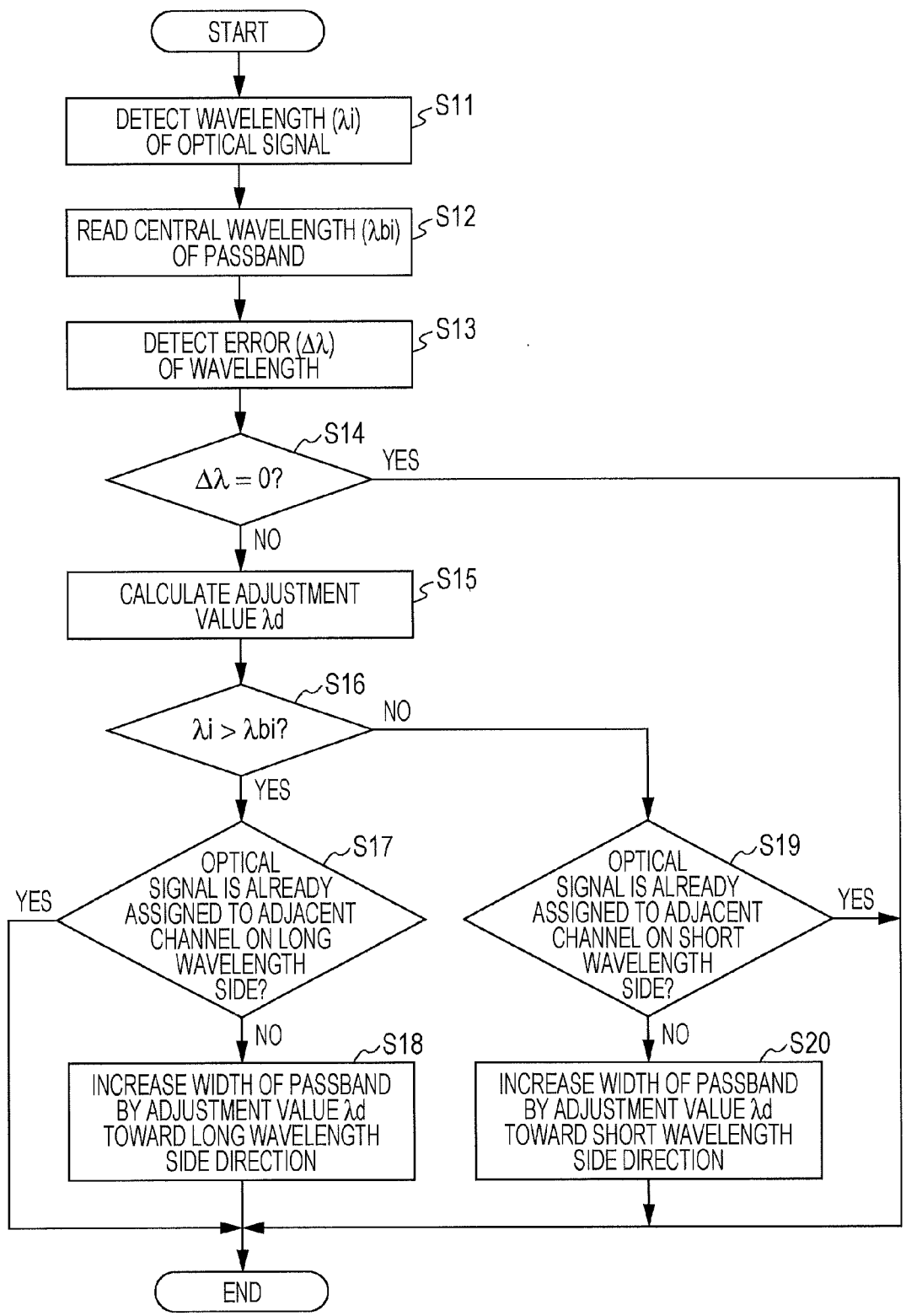
FIG. 18 is a flowchart of a process of adjusting a passband according to the second embodiment.

Next, a method for adjusting the passband BW of the WSS 10 according to the second embodiment is described with reference to FIG. 18. FIG. 18 is a flowchart of a process of adjusting the passband BW according to the second embodiment. Operations S11 to S14 illustrated in FIG. 18 are common to FIG. 9, and a description thereof is omitted.

If the error Δλ is not 0 (No in operation S14), the controller calculates the adjustment value λd (in operation S15). The adjustment value λd is calculated by the aforementioned Equation (3).

Next, the controller 11 determines a magnitude relationship between the wavelength λi and the central wavelength λbi (in operation S16). If λi>λkbi (Yes in operation S16), the controller 11 references the channel assignment information 30 and determines whether or not an optical signal is already assigned to the channel CHi+1 that is adjacent to the channel CHi on the long wavelength side (in operation S17). If the optical signal is not assigned (No in operation S17), the controller 11 increases the width of the passband BW corresponding to the channel CHi by the adjustment value λd toward the long wavelength side direction (in operation S18). If the optical signal is already assigned (Yes in operation S17), the controller 11 terminates the process.

If λi<λbi (No in operation S16), the controller 11 references the channel assignment information 30 and determines whether or not an optical signal is already assigned to the channel CHi−1 that is adjacent to the channel CHi on the short wavelength side (in operation S19). If the optical signal is not assigned (No in operation S19), the controller 11 increases the width of the passband BW corresponding to the channel CHi by the adjustment value λd toward the short wavelength side direction (in operation S20). If the optical signal is already assigned (Yes in operation S19), the controller 11 terminates the process. In this manner, the process of adjusting the passband BW is executed.

As described above, the transmission devices $9_1$ to $9_m$ according to the second embodiment each have the first and second OCMs 120 and 121, the WSS 10, and the controller 11. The OCMs 120 and 121 detect the wavelength λi of the optical signal. The optical signal is input to the WSS 10. The controller 11 detects a direction toward which the central wavelength λbi of the passband BW of the filter of the WSS 10 is shifted from the wavelength λi detected by the first and second OCMs 120 and 121. The controller 11 increases the width of the passband BW toward the opposite direction d of the direction toward which the central wavelength λbi of the passband BW is shifted.

The transmission devices $9_1$ to $9_m$ according to the second embodiment may increase the width of the passband BW and thereby cause the spectrum of an optical signal to be in the range of the passband BW. Since the transmission devices $9_1$ to $9_m$ according to the second embodiment increase the width of the passband BW only toward the opposite direction of a direction toward which the central wavelength λbi of the passband BW is shifted, an increase in a noise component superimposed on the optical signal due to the increase in the width of the passband BW is suppressed. Thus, the transmission devices $9_1$ to $9_m$ according to the second embodiment may efficiently suppress degradation of the optical signal and relax the limit on the number of devices for transmitting an optical signal while maintaining the quality of the transmission at a certain level in the network.

The method for adjusting a passband according to the second embodiment is to detect a direction toward which the central wavelength λbi of the passband of the filter of the WSS 10 to which an optical signal is input is shifted from the wavelength λi of the optical signal and to increase the width of the passband toward the opposite direction d of the direction toward which the central wavelength λbi of the passband is shifted. According to the method for adjusting a passband according to the second embodiment, an effect that is the same as or similar to the effect obtained by the transmission devices $9_1$ to $9_m$ according to the second embodiment may be obtained.

Third Embodiment

The aforementioned process of adjusting the passband BW may be executed by each of the plurality of transmission devices $9_1$ to $9_m$ illustrated in FIG. 1 or may be executed by only a transmission device that is selected from among the transmission devices $9_1$ to $9_m$ by the network management device 2 on the basis of the quality of transmission in the overall network.

Figure 19:
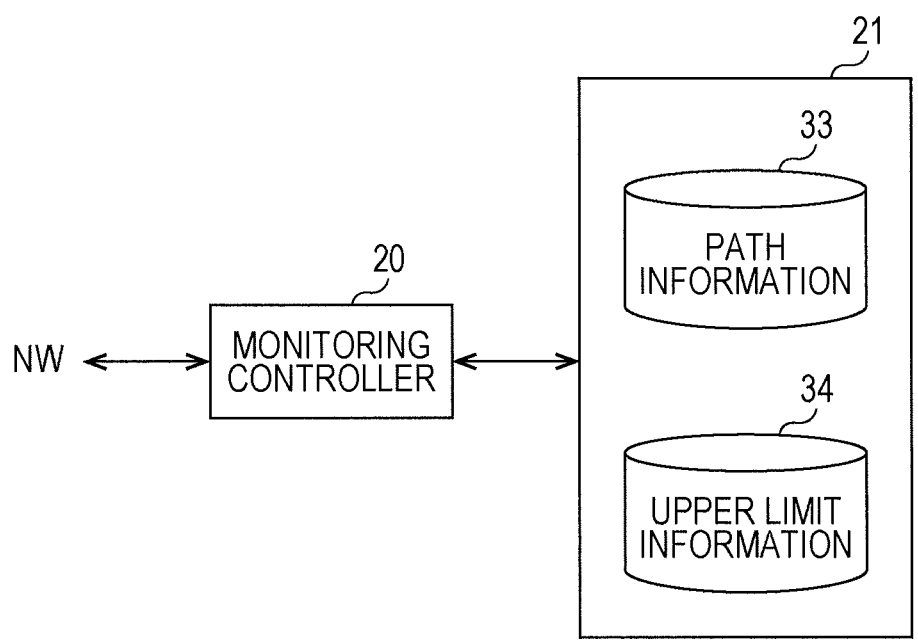
FIG. 19 is a diagram illustrating an example of the configuration of a network management device.

FIG. 19 is a diagram illustrating an example of the configuration of the network management device 2. The network management device 2 has a monitoring controller 20 and a storage unit 21.

The monitoring controller 20 is an arithmetic processing circuit such as a CPU and controls the network management device 2 on the basis of a predetermined program. The monitoring controller 20 communicates with the transmission devices $9_1$ to $9_m$ through the monitoring control network NW (refer to FIG. 1). The monitoring controller 20 is not limited to the controller that functions on the basis of the software. The monitoring controller 20 may be a controller that functions on the basis of hardware such as an application specific integrated circuit.

The storage unit 21 is, for example, a memory and stores path information 33 and upper limit information 34. The path information 33 indicates a path of an optical signal for each of channels CHi. The upper limit information 34 indicates an upper limit of the number of transmission devices that are among the transmission devices $9_1$ to $9_m$ and through which an optical signal passes while the quality of the transmission of the optical signal is maintained at a certain level.

For example, for the optical signal with the wavelength λi illustrated in FIG. 1, the path information 33 uses a series of identification numbers (node numbers) to indicate the order of the transmission devices $9_1$ to $9_4$ through which the optical signal passes. The upper limit L that is indicated by the upper limit information 34 is determined on the basis of degradation of the optical signal due to the shifting of the central wavelength of the passband. The upper limit L indicates the number of transmission devices that are among the transmission devices $9_1$ to $9_m$ and through which an optical signal passes while the quality of the transmission of the optical signal is maintained at a certain level.

FIG. 20 is a flowchart of a process of instructing, by the network management device 2, a transmission device among the transmission devices $9_1$ to $9_m$ to adjust a passband of the transmission device. The process is executed for each of the channels CHi.

First, the monitoring controller 20 acquires the path information 33 from the storage unit 21 and acquires, from the path information 33, a number K of transmission devices arranged on a transmission path of an optical signal (in operation S31). For example, for the optical signal with the wavelength λi illustrated in FIG. 1, the number K of transmission devices is 4. For the optical signal with the wavelength λi+1, the number K of transmission devices is 2.

Next, the monitoring controller 20 acquires the upper limit information 34 from the storage unit 21 and acquires the upper limit L of the number of transmission devices that are among transmission devices $9_1$ to $9_m$ and through which the optical signal passes (in operation S32). The upper limit L may be set as a value common to the channels CHi or may be set as a value for each of the channels CHi.

Then, the monitoring controller 20 determines a magnitude relationship between the number K of transmission devices and the upper limit L (in operation S33). If K≤L (No in operation S33), the monitoring controller 20 terminates the process. In the example of FIG. 1, when the upper limit L is 2, the number K of transmission devices through which the optical signal with the wavelength λi+1 passes is 2. Thus, the transmission devices $9_1$ and $9_2$ through which the optical signal with the wavelength λi+1 passes do not execute the process of adjusting the passband BW.

If K>L (Yes in operation S33), the monitoring controller 20 calculates a number M of transmission devices to be instructed to adjust the passband BW (in operation S34). The number M of transmission devices is calculated by the following Equation (4).

$$M = K - L \qquad \text{Equation (4)}$$

Next, the monitoring controller 20 instructs the number M of transmission devices among the transmission devices $9_1$ to $9_m$ to increase the width of the passband BW (in operation S35), while the number M exceeds the upper limit L. In this case, the monitoring controller 20 selects the number M of transmission devices to be instructed to adjust the passband BW from among the transmission devices $9_1$ to $9_m$.

In the example of FIG. 1, when the upper limit L is 2, the number K of transmission devices through which the optical signal with the wavelength λi passes is 4. Thus, a relationship of (M>L) is established in the determination process of operation S33. Then, the monitoring controller 20 instructs the transmission devices $9_3$ and $9_4$ that are in excess of the upper limit L and among the transmission devices $9_1$ to $9_4$ arranged on the transmission path of the optical signal to adjust the width of the passband BW. The monitoring controller 20 transmits an instruction to adjust the passband BW to the transmission devices $9_3$ to $9_4$ through the monitoring control network NW.

In this manner, the network management device 2 instructs the transmission devices $9_3$ to $9_4$ that are in excess of the upper limit L and among the transmission devices $9_1$ to $9_m$ arranged on the transmission path of the optical signal to increase the width of the passband BW. Thus, the number of transmission devices that increase the passband BW is reduced, and a noise component superimposed on the optical signal in the overall network due to the increase in the width of the passband BW is reduced. In addition, since the width of the passband BW is increased, the transmission devices $9_3$ to $9_4$ that are in excess of the upper limit L may suppress degradation of the optical signal, and it is possible to increase the number of transmission devices that are among the transmission devices $9_1$ to $9_m$ and through which an optical signal passes while the quality of the transmission is maintained at a certain level in the network.

Although the embodiments are described above in detail, it will be appreciated by persons skilled in the art that various changes and modifications may be made on the basis of the basic technical ideas and teachings of the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission device comprising:
   a wavelength detector configured to detect a first wavelength of a first optical signal;
   a wavelength selective switch to which the first optical signal is input; and
   a controller configured to detect a direction toward which a central wavelength of a passband of the wavelength selective switch is shifted from the first wavelength detected by the wavelength detector and to control the wavelength selective switch so as to increase a width of the passband toward an opposite direction of the direction toward which the central wavelength of the passband is shifted from the first wavelength.

2. The transmission device according to claim 1,
   wherein the wavelength selective switch is configured to separate a wavelength-multiplexed optical signal input thereto into the first optical signal with wavelength, to multiplex a second optical signal and the first optical signal passing therein with wavelength, and to output a wavelength-multiplexed optical signal.

3. The transmission device according to claim 1,
   wherein the controller detects a magnitude to which the central wavelength of the passband of the wavelength selective switch is shifted from the first wavelength so as to increase the width of the passband based on the magnitude.

4. The transmission device according to claim 1,
   wherein when an optical signal is not assigned to a second channel adjacent to a first channel to which the first optical signal is assigned, the controller increases the width of the passband by releasing a passband corresponding to the second channel so as to be useful for the first channel.

5. A transmission system comprising:
   a plurality of transmission devices arranged on a transmission path of an optical signal, each of the plurality of transmission device includes:
   a wavelength detector configured to detect a first wavelength of a first optical signal;
   a wavelength selective switch to which the first optical signal is input; and
   a controller configured to detect a direction toward which a central wavelength of a passband of the wavelength selective switch is shifted from the first wavelength detected by the wavelength detector and to control the wavelength selective switch so as to increase a width of the passband toward an opposite direction of the direction toward which the central wavelength of the passband is shifted from the first wavelength; and
   a managing device configured to manage the plurality of transmission devices,
   wherein each of the plurality of transmission devices has a number, and
   the managing device instructs a transmission device with a number that is in excess of a predetermined number to increase the width of the passband.

6. A method for adjusting a passband, comprising:
- detecting a direction with a controller toward which a central wavelength of a passband of a wavelength selective switch to which a first optical signal is input is shifted from a first wavelength of the first optical signal; and
- increasing a width of the passband toward an opposite direction of the direction toward which the central wavelength of the passband is shifted from the first wavelength.

7. The method according to claim 6,
- wherein the wavelength selective switch is configured to separate a wavelength multiplexed optical signal input thereto into the first optical signal with wavelength, to multiplex a second optical signal and the first optical signal passing therein with wavelength, and to output a wavelength-multiplexed optical signal.

8. The method according to claim 6, further comprising
- detecting a magnitude to which the central wavelength of the passband of the wavelength selective switch is shifted from the first wavelength so as to increase the width of the passband based on the magnitude.

9. The method according to claim 6,
- wherein when an optical signal is not assigned to a second channel adjacent to a first channel to which the first optical signal is assigned, the width of the passband is increased by releasing a passband corresponding to the second channel so as to be useful for the first channel.

* * * * *